(12) United States Patent
Meisner et al.

(10) Patent No.: US 8,751,843 B2
(45) Date of Patent: Jun. 10, 2014

(54) COMPUTER ENERGY CONSERVATION WITH A SCALABLE PSU CONFIGURATION

(75) Inventors: David Meisner, Mill Valley, CA (US); Thomas F. Wenisch, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 192 days.

(21) Appl. No.: 13/139,769

(22) PCT Filed: Dec. 16, 2009

(86) PCT No.: PCT/US2009/068210
§ 371 (c)(1),
(2), (4) Date: Jun. 15, 2011

(87) PCT Pub. No.: WO2010/077923
PCT Pub. Date: Jul. 8, 2010

(65) Prior Publication Data
US 2011/0264937 A1      Oct. 27, 2011

Related U.S. Application Data

(60) Provisional application No. 61/122,966, filed on Dec. 16, 2008.

(51) Int. Cl.
*G01F 1/32*       (2006.01)

(52) U.S. Cl.
USPC ........... 713/323; 713/300; 713/310; 713/320; 713/321; 713/322; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | | |
|---|---|---|---|
| 5,692,197 A | 11/1997 | Narad et al. | |
| 2004/0225907 A1 | 11/2004 | Jain et al. | |
| 2006/0265608 A1 | 11/2006 | Fung | |
| 2007/0220294 A1 | 9/2007 | Lippett | |

OTHER PUBLICATIONS

International Search Report for PCT/2009/068210, Jul. 30, 2010, 3 pages.

*Primary Examiner* — M Elamin
(74) *Attorney, Agent, or Firm* — Reising Ethington P.C.

(57) ABSTRACT

A power management method for use by a blade server or other networked computer having a CPU, memory, network interface, and timer. The method includes monitoring processes in the computer, determining that the computer has become idle, and switching the CPU and memory from an active state to a low power state while maintaining the network interface and timer in an active state. Power management for multicore processors is also provided. A power supply system can be used for providing shared power to groups of the networked computers that each have a similar active power demand. Each PSU in the power supply system is capable of supplying the active power demand at an efficiency greater than a preselected desired minimum efficiency. Changes in power requirements resulting from a computer switching between low power and active states can be accommodated by switching a single PSU into or out of the system.

12 Claims, 5 Drawing Sheets

COMPUTER ENERGY CONSERVATION WITH A SCALABLE PSU CONFIGURATION

This invention was made with government support under CCF0811320 awarded by the National Science Foundation. The government has certain rights in the invention.

CROSS-REFERENCE TO RELATED APPLICATION

This application claims the benefit of U.S. Provisional Application No. 61/122,966, filed Dec. 16, 2008, the entire contents of which are hereby incorporated by reference.

TECHNICAL FIELD

The present invention relates generally to energy conservation in computer systems and, more particularly, to techniques for reducing energy usage of servers and server power supplies.

BACKGROUND OF THE INVENTION

It is becoming more common for computers and other electronics to utilize low power quiescent modes during periods of substantial inactivity. For example, desktop and laptop computers can be placed into standby and hibernation modes in which the computer is essentially shut down and not able to function until manual switching of the computer back into its fully active state. Another power management approach short of a system-wide idling of the computer is to selectively power down only certain components, such as the computer's hard disk drive. However done, these approaches are commonly used on consumer computers, but may not be practical for use by servers where the rapid transitions and brief intervals of activity make it difficult to conserve idle power. Yet, as much as 60% of the power consumed by servers in a typical data center is wasted by idle servers that are powered on, but not performing useful work. The recent trend towards server consolidation is partly motivated by the high energy cost of idle systems. By moving services to virtual machines, several services can be time-multiplexed on a single physical server, increasing average utilization. Consolidation allows the total number of physical servers to be reduced, thereby reducing idle inefficiency. However, server consolidation by itself does not close the gap between peak and average utilization—data centers still require sufficient capacity for peak demand, which can leave some servers idle in the average case. Furthermore, consolidation does not save energy automatically—system administrators must actively consolidate services and remove unneeded systems.

Although support for sleep states is widespread in handheld, laptop and desktop machines, as noted above these states are not typically used in current server systems. The Advanced Configuration and Power Interface (ACPI) standard defines a rich set of power states that an operating system and hardware platform can use to manage power consumption. These low power states operate by transferring volatile data (e.g., main memory) to non-volatile storage (typically disk). Unfortunately, the high restart latency of these states renders them unacceptable for interactive services—disks simply provide insufficient I/O response time and bandwidth to restore memory state in fractions of a second. Moreover, unlike consumer devices, servers cannot rely on the user to transition between power states; they must have an autonomous mechanism that manages state transitions.

Figure 1:
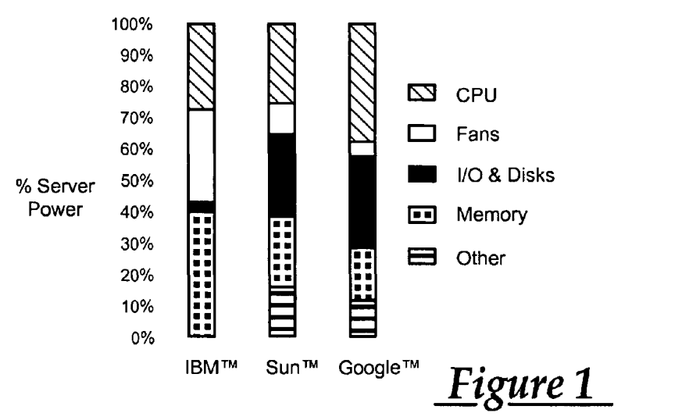
FIG. 1 depicts the power requirements of various components in several typical servers.

Recent server processors include CPU throttling solutions (e.g. Intel Speedstep™, AMD Cool'n'Quiet™) to reduce the large overhead of light loads. These processors use dynamic voltage and frequency scaling (DVFS) to reduce their operating frequency linearly while gaining cubic power savings. DVFS relies on operating system support to tune processor frequency to instantaneous load. In Linux, the kernel continues lowering frequency until it observes ~20% idle time. Improving DVFS control algorithms remains an active research area. Nonetheless, DVFS can be highly effective in reducing CPU power. However, as FIG. 1 shows, CPUs account for a small portion of total system power.

Energy proportional computing seeks to extend the success of DVFS to the entire system. In this scheme, each system component is redesigned to consume energy in proportion to utilization. In an energy-proportional system, explicit power management is unnecessary, as power consumption varies naturally with utilization. However, as many components incur fixed power overheads when active (e.g., clock power on synchronous memory busses, leakage power in CPUs, etc.) energy-proportional operation may not be readily achievable.

Another more recent concern is the AC to DC conversion losses in computer systems large and small, and this has led to a variety of research proposals, product announcements, and standardization efforts to improve power supply efficiency. The concern is particularly applicable to data centers, server farms and other multi-server systems such as can be implemented using blade servers, where each watt wasted in the power delivery infrastructure implies even more loss in cooling. As in conventional blade enclosures, power is provided by multiple PSUs connected in parallel. A conventional load-sharing IC continuously monitors and controls the PSUs to ensure load is divided evenly among them. Individual PSUs can be disabled and electrically isolated when they are not needed to supply the load.

A variety of recent initiatives seek to improve server power efficiency:

1. 80+ certification. The EPA Energy Star program has defined the "80+" certification standard to incentivize PSU manufacturers to improve efficiency at low loads. The 80+ incentive program is primarily targeted at the low-peak-power desktop PSU market. 80+ supplies carry an average 30% cost premium and require considerably higher design complexity than conventional PSUs, which may pose a barrier to widespread adoption in the reliability-conscious server PSU market. Furthermore, despite their name, the 80+ specification does not require energy efficiency above 80% across all loads, rather, only within the typical operating range of conventional systems.

2. Single voltage supplies. Unlike desktop machines, which require five different DC output voltages to support legacy components, server PSUs typically provide only a single DC output voltage, simplifying their design and improving reliability and efficiency.

3. DC distribution. Recent research has called for distributing DC power among data center racks, eliminating AC-to-DC conversion efficiency concerns at the blade enclosure level. However, the efficiency advantages of DC distribution are unclear and deploying DC power will require multi-industry coordination.

4. Dynamic load-sharing. Blade enclosures create a further opportunity to improve efficiency through dynamic load-sharing. Hewlett Packard's Dynamic Power Saver feature in the HP Blade Center c7000 employs up to six high efficiency 2.2 kW PSUs in a single enclosure, and dynamically varies the number of PSUs that are engaged, ensuring that all active supplies operate in their "green" zone while maintaining redundancy.

SUMMARY OF THE INVENTION

In accordance with one aspect of the invention, there is provided a power management method for use by a networked computer having a CPU, memory, network interface, and at least one timer. The method includes the steps of monitoring processes in the computer, determining that the computer has become idle, and switching the CPU and memory from an active state to a low power state while maintaining the network interface and the timer in an active state. For multicore processor operation, if any of the cores are idle, tasks for the other cores can be stalled (e.g., paused or process-delayed) until either a maximum timeout or additional tasks arrive such that all cores have pending work. While stalled, the processor is then put into the low power state.

In accordance with another aspect of the invention, there is provided a power managed networkable computer that includes a processor, memory accessible by the processor, a network interface for receiving and transmitting communications over a network, and a timer. The memory and processor are switchable between an active state and a low power state, and the computer operates to switch the processor and memory to a low power state in response to determining that the processor has become idle. The timer runs at least during operation of the processor and memory in the low power state such that, upon expiration of the timer, the processor and memory will switch back to the active state. The computer also switches the processor and memory back to the active state in response to arrival of data at the network interface that requires either processing by the processor or access to the memory.

In accordance with yet another aspect of the invention, there is provided a load sharing power supply system for a group of computers that each receive operating power from a common power bus and that each having a similar active power demand. The power supply system includes a plurality of power supply units and a control circuit. Each of the power supply units are capable of supplying the active power demand at an efficiency greater than a preselected desired minimum efficiency, and each has an output capable of being selectively connected to or isolated from the common power bus. The control circuit selectively connects the output of individual ones of the power supply units to the common power bus. This provides nearly one to one correspondence of the power supply units with the computers so that as a computer is brought into its active state, a single power supply unit can then be switched onto the power bus to deliver the additional power needed. And for this purpose, low cost, high-efficiency standard PSUs can be utilized in an economical and energy efficient manner.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The following description is directed to a power management system and method for use with servers or other networked computers. This power management approach uses a server-wide sleep mode (SSM) which can be used to transition nearly all power drawing components of a server or other networked computer into a low power state while monitoring for either new processing tasks (e.g., new packet arrivals over the network) or expiration of a timer that indicates some processing or work is to be done. In the illustrated embodiment, the SSM approach is described in the context of blade servers: that is, a plurality of modular servers that are plugged into a chassis, which provides shared power, networking, and cooling, and other shared system components. The blade chassis centralizes environmental monitoring and cooling systems, amortizing their energy costs over many napping blades. However, as will become apparent to those skilled in the art, the SSM is also applicable to other server and client computer architectures.

Also described below is a load sharing power supply system and method for use with a group of computers such as the blade server environment discussed herein. This load sharing power supply technique is referred to herein as RAILS (Redundant Array of Inexpensive Load Sharing supplies), and is particularly useful in conjunction with groups of computers that utilize the SSM.

SSM Servers

SSM-enabled servers provide two distinct modes of operation: active mode and sleep mode. Whenever the server becomes idle, it transitions to sleep mode, which is a low power state in which the server remains quiescent, consuming minimal power until work arrives. When work arrives, the server returns to the active mode, or active state, in which the server resumes normal operation and power draw. From the point of view of software executing on the server, this transition is seamless and appears as if the server was in active mode the entire time. The sleep mode supports low-latency sleep and wakeup transitions. FIG. 1 depicts the power requirements of various components in several typical servers. As can be seen, no single server component dominates power consumption. For this reason, the SSM approach puts all main system components into a low power state whenever the server becomes idle, maximizing power savings.

SSM state transitions add start-up latency each time new work arrives at an idle system. Because of the rigid performance demands of modern servers, the SSM architecture seeks to minimize overhead incurred by these transitions. Preferably, SSM transitions are near-instantaneous to avoid performance impact. Hence, the sleep mode preserves volatile state (e.g., the contents of main memory). Furthermore, sleep mode is transparent to application software—application software is unaware of SSM transitions and the system appears to applications as if no transitions occur. Sleep mode is implemented through low power operating modes offered by each system component. The common requirements on these per-component low-power modes for a typical server are described further below.

Figure 2:
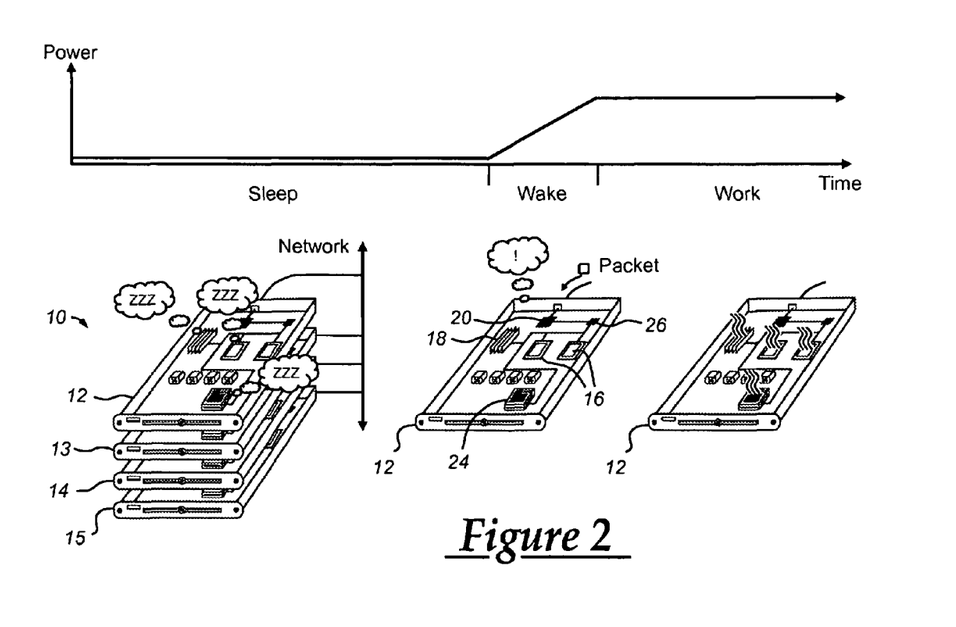
FIG. 2 shows a power managed networked server system that depicts different operational states and a transition between states for one of the servers.

FIG. 2 illustrates an exemplary system 10 that includes a group of networked computers 12-15 that each utilize the power management approaches described herein. In the particular embodiment shown, a plurality of blade servers 12-15 are networked together or to different networks which can be done in any of a variety of ways known to those skilled in the art. FIG. 2 depicts one of the servers (server 12) along a timeline wherein the server 12 is in the sleep mode, then as needed undergoes a wakeup transition to the active mode. Each time a server exhausts all pending work, it transitions back to the low power (sleep) state. In this state, nearly all system components enter low-power/sleep modes (which many system components already provide). Two classes of devices are not put to sleep: (1) input devices that deliver new work, and (2) hardware timers that count down until some non-input-related source delivers new work. In most servers, the first class comprises environmental monitoring devices (e.g., temperature sensors) and the network interface card (arriving packets signal the arrival of new work). Hardware timers are used to wake the system up in response to software-generated events, for example, a software timeout that closes a network connection after 30 seconds of inactivity. When some work arrives, the system wakes and transitions back to active state. When the work is complete, the system returns to the sleep state. While in sleep mode, power consumption is low, but no processing by the CPU can occur.

Figure 3:
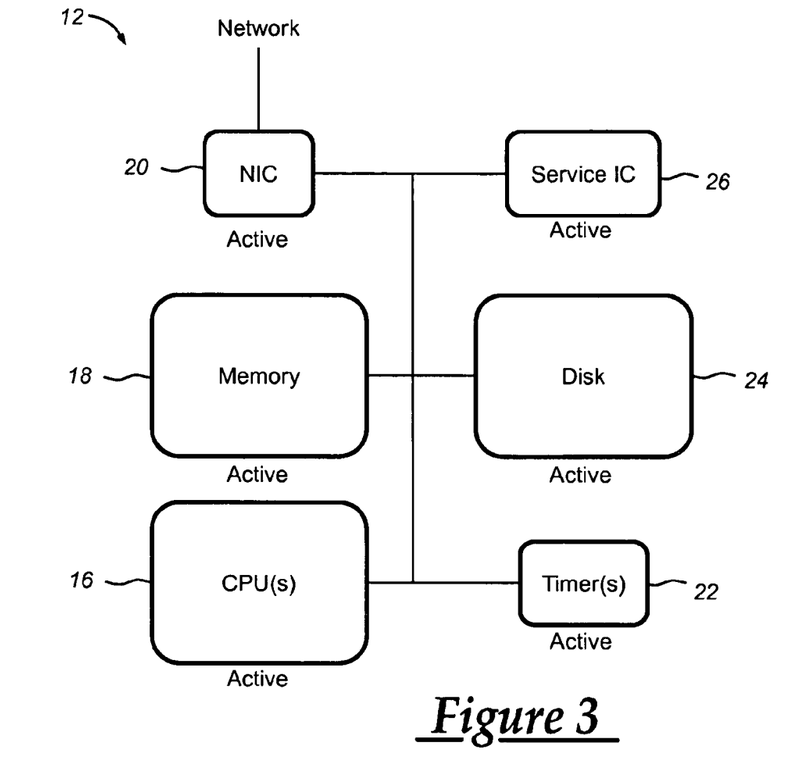
FIG. 3 shows various components of one of the servers of FIG. 2 including their interconnections and operational states while the server is in the active mode.

With reference to FIG. 3, there is shown a number of the internal components of each server 12 with the operating state of each being shown. These components include a CPU (processor) 16, DRAM or other computer readable memory 18, a network interface card (NIC) 20, one or more timers 22, non-volatile storage such as a solid state disk (SSD) 24, and a service IC 26 that interfaces with the environmental sensor(s) or other inputs. As is seen in FIG. 3, when in the active state, all components are operating in their respective active modes. The active mode closely resembles normal operation for a typical server. In other words, all the components can operate at maximal performance levels. If these components have multiple power/performance settings, they can be set to achieve maximum performance.

Figure 4:
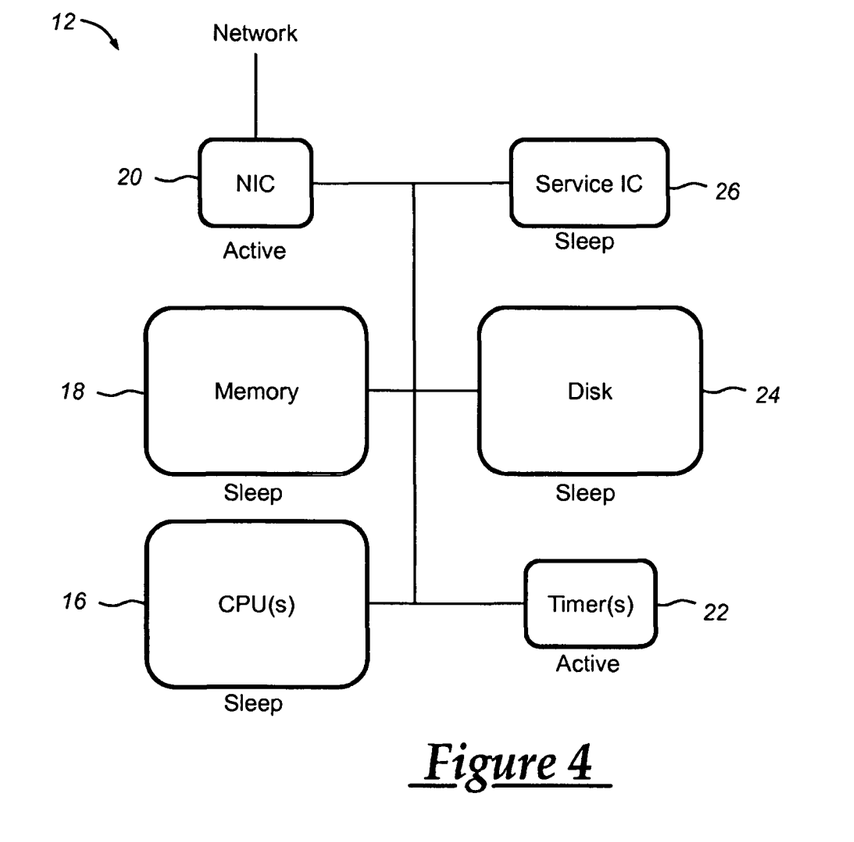
FIG. 4 shows the server components as in FIG. 3 along with their operational states while the server is in the sleep mode.

FIG. 4 depicts the state of the various components of the server 12 when the server has been transitioned to the low power state. This sleep mode provides the server 12 with an ultra-low power state such that the power consumption is greatly reduced relative to an active server or idle server with conventional power management features. One advantageous feature of the SSM approach is that system-wide power savings can be achieved by putting nearly all system components into a low power state. In this way, a server 12 may reduce its power consumption by an order of magnitude or more when idle.

Figure 5:
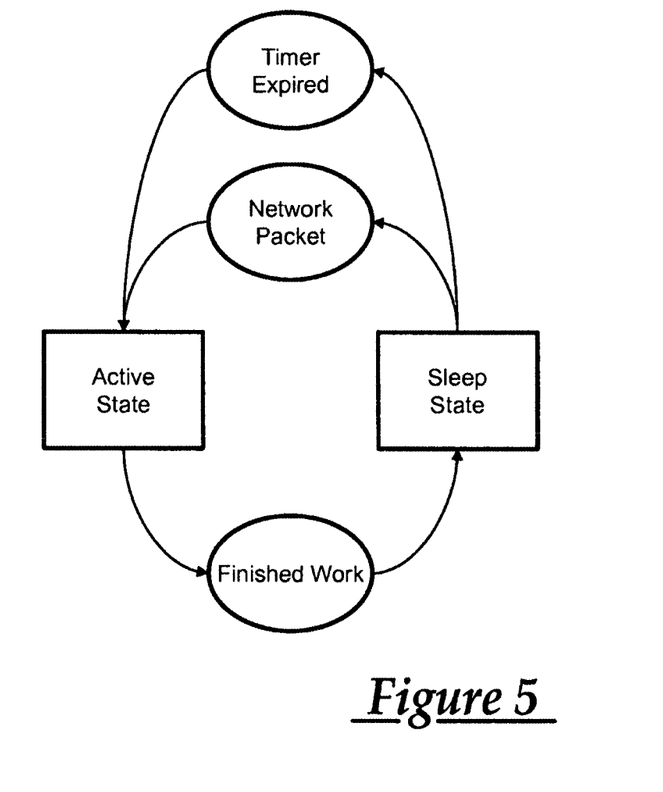
FIG. 5 is a state diagram depicting the transitions between active and low power states for the server of FIG. 2.

FIG. 5 shows the state transitions that can occur. The following characteristics describe the characteristics of the sleep mode:

1) Preservation of State—Volatile system state (defined as any state that is visible to software, but is not normally preserved when the system is turned off) is preserved in sleep mode. Examples of volatile state include data held in main memory, CPU registers, and other volatile stores (e.g. DRAMs, SRAMs, Z-RAM, TTRAM). State is maintained either by putting volatile memory 18 in low power modes, such as self-refresh for DRAM main memory, or by transferring state to non-volatile storage 24. State preservation is done so that, upon leaving the sleep mode, normal operation may resume without any software actions (e.g., reboot the server or reload state from slow mass storage devices). Volatile states that are not visible to software (e.g., CPU caches) can also be preserved if desired for a particular implementation to reduce transition times or otherwise improve performance.

2) Inactivity—The server 12 does not perform computation in the sleep mode. The definition of activity may be flexibly determined by software. Preferably, the only active system devices are those involved in triggering wake-up transitions as outlined above.

3) Transparency—The low power state transitions are not visible to user application software (except indirectly if the software monitors power consumption or performance). These applications behave as if the system remained in the active mode at all times. The sleep mode transitions may be visible to operating system or other low-level software to manage state transitions.

4) Minimal Power Draw—Preferably, power draw is minimized when in the sleep mode; however, minimal power is not a requirement of the system 10, but rather any reduction in power draw from that of active mode is sufficient.

Server 12 will undergo a transition to sleep mode when it becomes idle. The system can be considered idle when, for example, the following conditions are met:

1) Application software is inactive—There are no application programs or system processes ready to schedule by the operating system kernel. The server 12 may include policies that distinguish among processes that are critical (where, if the process is ready, the server must remain active), and background processes (where work may be deferred and the served considered idle even though the process is ready.) For example, a web server may define the system idle when no threads are currently processing http requests, but may defer background tasks, such as reclaiming freed memory.

2) No Work Queued at Input Devices—The system has no outstanding work pending in the queues of input devices, such as the network interface card (NIC) 20 or environmental monitors connected to the service IC 26.

3) No Expiring Timer Events—No timer events are scheduled to expire within the interval required to transition into and back out of sleep mode. Expiring timers imply work needs to be done; the server 12 will not enter sleep mode if it would delay the processing of a timer or immediately return to active mode.

Once the conditions above are met, the system will transition its components into their respective low power mode as described earlier. Switching to the low power state can be done by command from the processor 16 in response to detecting that it has become idle, or can be handled by a separate control device that monitors processor operation and initiates a change to low power state and/or back to the active state.

Server 12 performs a wake transition in order to switch from sleep mode to active mode. The server 12 will transition into the active state on either of two events:

1) Arrival of external input—An input device receives input that requires action. For example, the NIC 20 receives a packet destined for this server 12. The MC monitors network traffic while in sleep mode and identifies packets relevant for this particular server. Upon receiving a qualifying packet, the NIC 20 triggers a wake transition.

2) Timer Expiration—A timer 22 indicates the operating system or other software/hardware components have scheduled work to occur at this time, and triggers a wake transition. Examples of programmable timers include the PIT timer or HPET timer.

Server 12 can also wakeup in response to an environmental condition that requires system action, such as when a sensed temperature crosses a preset threshold. These sensors can be connected to the system via IC 26, as noted above.

The following is a list of some of the individual computer components for which the sleep mode can be used.

Processor: ACPI S3 "Sleep" state. The ACPI standard defines the S3 "Sleep" state for processors that is intended to allow low-latency transitions. Though the ACPI standard does not specify power or performance requirements, some implementations of S3 are useful for the SSM approach. For example, in the Intel™ mobile processor line, S3 preserves last-level caches and consumes only 3.4 W. If a processor does not preserve writeback cache contents, they are flushed to memory when entering sleep mode. It takes approximately 30 μs for PLL stabilization to transition from sleep back to active execution. If S3 is unavailable, clock gating can also provide substantial energy savings. For example, Intel's Xeon 5400-series power requirements drop from 80 W to 16 W upon executing a halt instruction. From this state, resuming execution requires only nanosecond-scale delays.

DRAM: Self-refresh. DRAM is often the second most power-hungry system component when active. However, several recent DRAM specifications feature an operating mode, called self-refresh, where the DRAM is isolated from the memory controller and autonomously refreshes DRAM content. In this mode, the memory bus clock and PLLs are disabled, as is most of the DRAM interface circuitry. Self-refresh saves more than an order of magnitude of power. For example, a 2 GB SODIMM (designed for laptops) uses only 202 mW of power during self-refresh. Transitions into and out of self-refresh can be completed in less than a microsecond.

Mass Storage: Solid State Disks. Solid state disks draw negligible power when idle, and, hence, do not need to transition to a sleep state for the SSM approach. A recent 64 GB Samsung™ SSD consumes only 0.32 W while idle.

Operating System: Tickless kernel. For schemes like that disclosed herein for server 12, the periodic timer interrupt used by legacy OS to track real time and implement software timers poses a challenge. As the timer interrupt is triggered every 1 ms, conventional OS time keeping precludes the use of SSM. The periodic clock tick also poses a challenge for idle-power conservation on laptops and for virtualization platforms that consolidate hundreds of OS images on a single hardware platform. Hence, the Linux kernel has recently been enhanced to support "tickless" operation, where the periodic timer interrupt is eschewed in favor of hardware timers for scheduling and time keeping. At least some embodiments of SSM depend on a kernel that provides tickless operation.

Network Interface: Wake-on-LAN. The SSM approach permits wake up of the server 12 by the network interface card 20 upon arrival of a packet. Existing NICs already provide support for Wake-on-LAN to perform this function. Current implementations of Wake-on-LAN provide a mode to wake on any physical activity. This mode can be used for SSM support. Current NICs consume only 400 mW while in this mode.

Environmental Monitoring & Service Processors: Active/Sleep Mode Transition Management. Servers typically include additional circuitry for environmental monitoring, remote management (e.g., remote power on), power capping, power regulation, and other functionality. These components typically manage ACPI state transitions, and hence, would coordinate transitions between the active and sleep state. A typical service IC draws less than 10 mW when idle.

Fans: Variable Speed Operation. Fans are also frequently a dominant power consumer in servers. Modern servers employ variable-speed fans where cooling capacity is constantly tuned based on observed temperature or power draw. To maintain a constant temperature, cooling capacity should match the system/component average power draw. Fan rotational speed is approximately proportional to cooling capacity and fan power requirements are cubic in rotational speed. Hence, the average power savings using the SSM approach results in massive reductions in fan power requirements. Because thermal conduction progresses at drastically different timescales than the SSM transition frequency, fan control is independent of SSM state (i.e., fans may continue operating during sleep mode and may spin down during active operation depending on temperature conditions).

Multicore SSM Servers

Many newer processors contain a plurality of processing cores. These processing cores act independently and without concern for their individual or collective impact on power use. One difficulty in applying the SSM approach to multicore processors is that the SSM process desirably uses full-system idleness such that none of the cores of the CPU are able to process instructions. In one implementation, this means that the processor is not transitioned to the sleep mode unless and until all cores have become idle. For a four core processor, for example, the percentage of time the processor is fully idle may be very low even where the server load is light or moderate enough to only be using one or two cores at a time. To increase total idleness of the processor, and thus the total amount of time it can be maintained in the low power state, concurrency of use of the multiple cores can be enforced by stalling execution of tasks by certain cores until all others have pending tasks to carry out as well. These tasks (e.g., application processes) can be stalled either by pausing tasks currently being executed or delaying pending tasks or the arrival of tasks at the cores that have not yet already begun processing. Although job arrival distribution cannot be directly controlled (as this is a property of how a server is accessed by its users), the apparent arrival distribution can be influenced by stalling particular tasks.

To address this multicore operational characteristic, a scheduling scheme can be used to increase exploitable idleness. To improve energy efficiency, the active and idle times for all cores are aligned as much as possible, such that all cores are, as best as possible, either simultaneously active or simultaneously idle. This can be done as noted above by stalling service any time that at least one of the cores is idle. During stalls, the server-wide sleep mode (SSM) approach is invoked to save energy. By only allowing execution when all cores are busy, the server 12 can increase its energy efficiency (the power required to operate the system amortized over the maximum amount of concurrent work). If strictly implemented, this policy means that all core-grain idleness is exploitable at the system level. Of course, such an approach could result in massive (potentially unbounded) increases in response time. To limit the impact on response time, the maximum amount of time any job may be stalled can be constrained; for example, by using a timer. Hence, if not all cores are occupied, but at least one particular job in the system has accrued its maximum allowable stall time, server 12 will resume service and allow all cores to execute until that particular job completes. When service proceeds due to exhausting a job's allowable stall time, some core-grain idleness is lost (cannot be used to conserve energy). However, the maximum stall threshold bounds the response time increase resulting from using this approach, and this bound can be chosen based on the amount of slack available between the current 95th-percentile response time and that required by pre-determined performance targets. In reality, the actual increase in 95th percentile response time appears to be substantially smaller than the stall threshold, as most jobs are not stalled to their limit. Table I summarizes the rate at which increased stall timeout changes the 95th-percentile response time for a selection of server applications.

TABLE 1

| | Backup | Cluster | DNS | Mail | Shell | Web |
|---|---|---|---|---|---|---|
| $\Delta R_{95}$ Slope | .56 | .53 | .56 | .51 | .51 | .65 |

Figure 6:
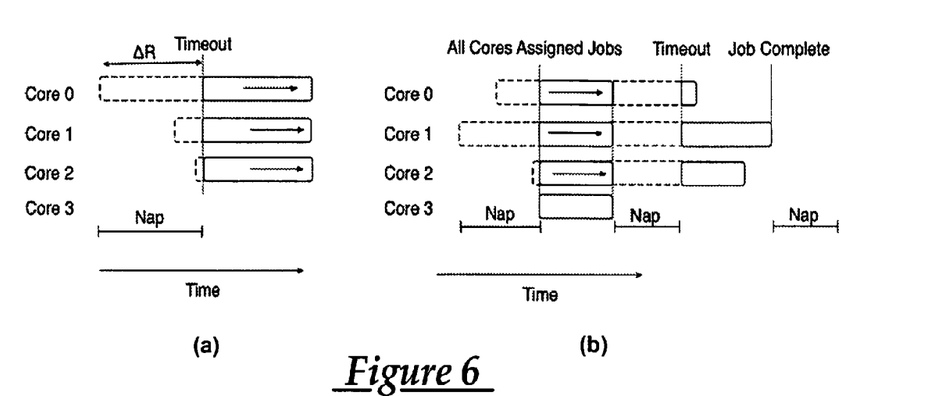
FIG. 6 depicts a process for stalling tasks that can be used in a multicore processor environment.

FIG. 6 depicts a time sequence illustrating the operation of the multicore SSM method described above in a 4-core server. Graph (a) in FIG. 6 depicts operation of the timeout mechanism which can use a timer to force processing of a task if too much time elapses before all cores have pending tasks. Service is initially stalled and the server is in sleep mode such that all four cores are napping. At first, only three jobs are in the server. Then, the job at Core 0 reaches its maximum allowable delay (timeout). Job processing then resumes and all current jobs are released until the job at Core 0 finishes. Subsequently, the system will again stall any tasks (unless all four cores are processing) and re-enter sleep mode. Graph (b) of FIG. 6 demonstrates the behavior when all cores become occupied. The server is initially stalled and in its low power state. Then, a job arrives at Core 3, occupying all cores and starting service. As soon as the first job completes (at Core 3), the system again stalls and returns to sleep mode. Shortly thereafter, the job at Core 1 reaches timeout. Hence, service resumes and continues until the job at Core 1 is finished.

Using the above approach of stalling tasks when at least one core is idle and then entering the sleep mode, new jobs will continue to arrive while the processor is stalled and sleeping. This state will continue until either all cores have tasks or a timer expiration (signaling expiration of a maximum delay time). This maximum delay timeout for each pending task can be implemented with a hardware timer. However, the server requires a mechanism to detect when sufficient jobs have arrived during a sleep interval to occupy all cores and resume service. The effectiveness of the described stall and sleep approach could be undermined if the server had to wake back to active state to process, count, then defer each arrival and return to sleep. To avoid this, any of a variety of hardware and software mechanisms can be used to implement the above-described job management requirements while idle. In hardware, a TCP offload engine or simple, low-power microcontroller can be used to observe a queue of arriving work and act appropriately. In a multi-tiered software application, one tier might manage the queue state and activity of another, or admission control systems being executed on another server might remotely control server sleep and wake transitions. Workload specific queue management solutions may be required in some cases. These and other such implementations will be apparent to those skilled in the art.

RAILS

SSM fundamentally alters the range of currents over which a blade chassis must efficiently supply power. Hence, the SSM approach preferably uses a power supply that provides high conversion efficiency even at low power draw (well under 10% of peak power draw). Typical power supplies do not provide efficient conversion at this low load. Because the SSM power draw is so much lower than the idle power in conventional servers, good conversion efficiency should be maintained over a wide range, from as few as 300 W to as much as 7.2 kW in a fully-populated enclosure. For this purpose, a blade server configuration such as system 10 can benefit from the RAILS system described below.

Figure 7:
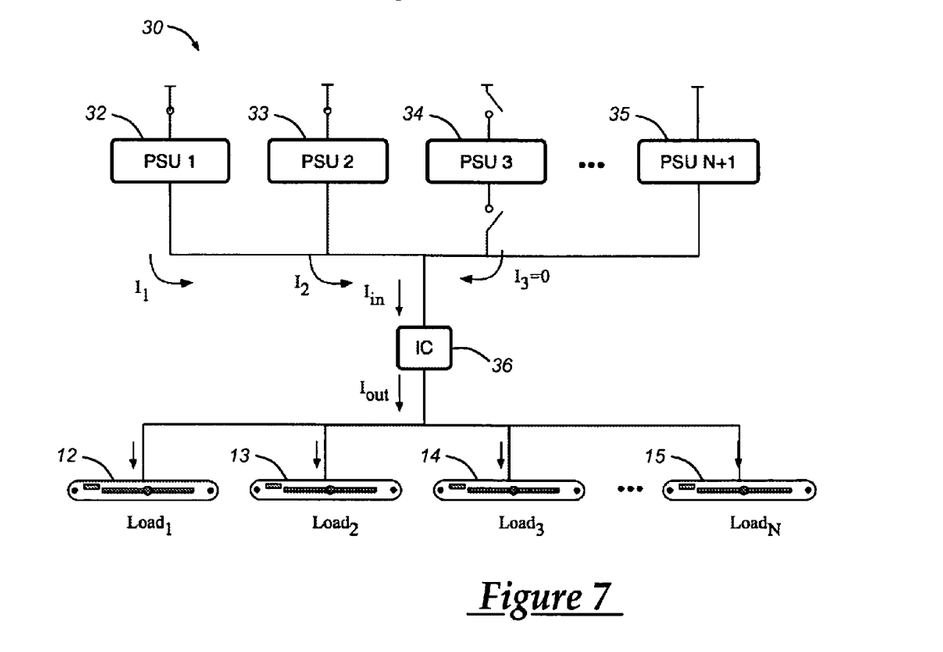
FIG. 7 is a block diagram showing a load sharing power supply system that can be used with the networked server system of FIG. 1.

FIG. 7 illustrates an embodiment 30 of RAILS. As in conventional blade enclosures, power is provided by multiple power supply units (PSUs) 32-35 connected in parallel. A load-sharing IC 36 continuously monitors and controls the PSUs 32-35 to ensure load is divided evenly among them. RAILS disables and electrically isolates PSUs that are not necessary to supply the load. However, unlike prior art systems, the RAILS system can use highly economical PSUs (i.e., PSUs of the type sold in the high-sales-volume market for low-wattage commodity supplies). Preferably, the RAILS power supplies all satisfy two criteria: (1) the selected supply must be operating in its "green" (e.g., >80% efficiency) zone when all blades 12-15 are in SSM sleep mode (this criterion establishes an upper bound on the PSU capacity based on the minimum power draw with all blades napping); and (2) subject to this bound, the PSUs 32-35 should be sized to match the incremental power draw of activating a blade server. Thus, as each server 12-15 awakens from its sleep mode, one additional PSU is brought online. Because of intelligent sizing, each of these PSUs will be at high-load and high-efficiency. Whereas current blade servers use multi-kilowatt PSUs, a typical RAILS PSU might supply 500 W.

The RAILS topology described below provides high conversion efficiency across SSM's power demand spectrum, provides N+1 redundancy, allows for graceful degradation of compute capacity when PSUs fail, and minimizes costs by using commodity PSUs in an efficient arrangement. This approach of load-sharing over multiple inexpensive, small PSUs enables the RAILS system 30 to provide the efficiency and reliability of larger, more expensive units. Through intelligent sizing and load-sharing, the active PSUs run at or near their most efficient point of operation. This scheme provides 80+ efficiency and enterprise-class redundancy with commodity components. Thus, it will be appreciated that RAILS targets three key objectives: (1) efficiency across the entire SSM dynamic power range; (2) N+1 reliability and graceful degradation of compute capacity under multiple PSU failures; and (3) minimal cost.

Although the form-factor of commodity PSUs may prove awkward for rack-mount blade enclosures, precluding the use of off-the-shelf PSUs, the power density of high-sales-volume PSUs differs little from high-end server supplies. Hence, with appropriate mechanical modifications, it is possible to pack RAILS PSUs in roughly the same physical volume as conventional blade enclosure power systems. RAILS meets its reliability goals by providing fine-grain degradation of the system's peak power capacity as PSUs fail. In any N+1 design, the first PSU failure does not affect compute capacity. However, in conventional blade enclosures, subsequent failure may force shutdown of several (possibly all) blades. Multiple-failure tolerance typically requires 2N redundancy, which is expensive. In contrast, in RAILS, where PSU capacity is matched to the active power draw of a single blade, the second and subsequent failures each require the shutdown of only one blade.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance", "such as", and "like", and the verbs "comprising", "having", "including", and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A power management method for a networked computer, comprising the steps of:
monitoring processes in a networked computer that comprises a plurality of computer components including a CPU, memory, a network interface, and at least one timer, wherein the CPU comprises a multicore processor having a plurality of cores each capable of processing instructions independently of the one or more other cores;
determining that less than all of the cores of the CPU have tasks to process; and
switching, by a control device, the CPU and all of its cores and the memory from an active state to a low power state in response to the determination that less than all of the cores have tasks to process while maintaining the network interface and the timer in an active state.

2. The power management method of claim 1, wherein the switching step further comprises stalling one or more tasks associated with the other cores.

3. The power management method of claim 1, further comprising the step of switching the CPU and memory back to the active state upon expiration of a timer associated with one of the stalled tasks.

4. The power management method of claim 1, further comprising the steps of:
monitoring for receipt of new tasks; and
switching the CPU and memory back to the active state upon determining that all of the cores has an associated task to be processed.

5. The power management method of claim 4, wherein the step of monitoring for receipt of new tasks further comprises monitoring for receipt of new tasks using a separate hardware device while the CPU is in the low power state.

6. The power management method of claim 5, wherein the hardware device is located in the networked computer.

7. A power management method for a number of networked computers, comprising the steps of:
monitoring processes in each of a number of networked computers wherein each of the number of computers has a similar active power demand and is connected to receive power from a common power bus, and further wherein each of the number of computers comprises a plurality of computer components including a CPU, memory, a network interface, and at least one timer;
determining that two or more of the number of computers has become idle; and
switching, by one or more control devices, the CPU and memory of each of the two or more of the number of computers from an active state to a low power state while maintaining the network interface and the timer thereof in an active state.

8. A power managed networkable computer, comprising:
a CPU including a plurality of cores each capable of processing instructions independently of the one or more other cores;
memory accessible by the CPU, said memory and CPU being switchable between an active state and a low power state;
a network interface for receiving and transmitting communications over a network; and
a timer that runs at least during operation of the CPU and memory in the low power state;
wherein
the computer operates to determine that less than all of the cores of the CPU have tasks to process and, in response to the determination, operates to switch the CPU and all of its cores and the memory from the active state to the low power state, and further operates to maintain the network interface and timer in an active state.

9. A load sharing power supply system for a group of computers each receiving operating power from a common power bus and each having a similar active power demand, the power supply system comprising:
a plurality of power supply units, each capable of supplying the active power demand at an efficiency greater than a preselected desired minimum efficiency, said power supply units each having an output capable of being selectively connected to or isolated from the common power bus; and
a control circuit for selectively connecting the output of individual ones of the power supply units to the common power bus.

10. A load sharing power supply system as defined in claim 9, wherein each of the power supply units has a supply capacity that is matched with the active power demand such that for each computer that is switched from a low power state to an active state, an additional power demand required to run the now active computer can be supplied by switching a single one of the power supply units onto the common power bus via its output.

11. A load sharing power supply system as defined in claim 9, further comprising a controller that controls switching of the power supply units onto and off the common power bus in accordance with the total active power demand of the group of computers.

12. The power management method of claim 7, wherein the common power bus is supplied with power from a plurality of power supply units, each capable of supplying the active power demand at an efficiency greater than a preselected desired minimum efficiency, and each having an output capable of being selectively connected to or isolated from the common power bus, and wherein the method further comprises the steps of selectively connecting or disconnecting the output of individual ones of the power supply units to the common power bus in accordance with the switching of the CPU and memory of individual networked computers between the active and low power states.

* * * * *